(12) United States Patent
Lee et al.

(10) Patent No.: US 12,339,251 B2
(45) Date of Patent: Jun. 24, 2025

(54) STEEL PLATE SURFACE MATERIAL PROPERTY TESTING DEVICE AND STEEL PLATE SURFACE MATERIAL PROPERTY TESTING METHOD

(71) Applicant: POSCO, Pohang-si (KR)

(72) Inventors: Ju-Seung Lee, Gyeongsangbuk-do (KR); Seong-Ung Koh, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 122 days.

(21) Appl. No.: 17/786,374

(22) PCT Filed: Dec. 17, 2020

(86) PCT No.: PCT/KR2020/018538
§ 371 (c)(1),
(2) Date: Jun. 16, 2022

(87) PCT Pub. No.: WO2021/125828
PCT Pub. Date: Jun. 24, 2021

(65) Prior Publication Data
US 2023/0019171 A1 Jan. 19, 2023

(30) Foreign Application Priority Data
Dec. 20, 2019 (KR) .......................... 10-2019-0171461

(51) Int. Cl.
*G01N 27/90* (2021.01)
*G01N 27/9093* (2021.01)
(52) U.S. Cl.
CPC ..... *G01N 27/9006* (2013.01); *G01N 27/9046* (2013.01); *G01N 27/9093* (2013.01)
(58) Field of Classification Search
CPC ........... G01N 27/9006; G01N 27/9046; G01N 27/9093
(Continued)

(56) References Cited

U.S. PATENT DOCUMENTS 3,646,789 A 3/1972 Forster
8,013,600 B1 * 9/2011 Yepez, III .......... G01N 27/9006
324/240

(Continued)

FOREIGN PATENT DOCUMENTS

CN 103323522 9/2013
CN 103323522 A 9/2013
(Continued)

OTHER PUBLICATIONS

Hiroharu et al.; Translation of JP 2007187551; Jul. 26, 2007; Translated by EPO & Google (Year: 2007).*
(Continued)

*Primary Examiner* — Eman A Alkafawi
*Assistant Examiner* — Rahul Maini
(74) *Attorney, Agent, or Firm* — Morgan Lewis & Bockius LLP

(57) ABSTRACT

The steel plate material property testing device determining a material property of a surface of the steel plate by generating the eddy current in the steel plate includes: an eddy current tester disposed so as to face the steel plate; and a frame to which the eddy current tester is fixed, in which the eddy current tester includes: a coil disposed so as to form an alternating-current (AC) magnetic field in only one direction; an AC power supply unit connected to the coil; a sensor unit connected to the coil; and a material property determination unit connected to the sensor unit and determining the material property of the steel plate based on a measured signal obtained through the sensor unit.

11 Claims, 15 Drawing Sheets

(58) Field of Classification Search
USPC .......................................................... 324/240
See application file for complete search history.

(56) References Cited

U.S. PATENT DOCUMENTS

| | | | |
|---|---|---|---|
| 2010/0134099 | A1 | 6/2010 | Hyodo et al. |
| 2013/0249540 | A1 | 9/2013 | Lepage |
| 2018/0299383 | A1 | 10/2018 | Vacca |
| 2018/0299393 | A1 | 10/2018 | Makino |
| 2022/0205950 | A1* | 6/2022 | Ozeki ................... G01N 27/87 |

FOREIGN PATENT DOCUMENTS

| | | | | |
|---|---|---|---|---|
| CN | 107709981 | | 2/2018 | |
| CN | 107709981 | A | 2/2018 | |
| EP | 0096078 | A1 | 12/1983 | |
| JP | S50-26951 | B1 | 9/1975 | |
| JP | S58-102148 | A | 6/1983 | |
| JP | S60-039552 | A | 3/1985 | |
| JP | S61264251 | A * | 11/1986 | ............. G01N 27/90 |
| JP | H5-66533 | U | 9/1993 | |
| JP | H08-178902 | A | 7/1996 | |
| JP | H10-078336 | A | 3/1998 | |
| JP | 2000-227421 | A | 8/2000 | |
| JP | 2001-056317 | A | 2/2001 | |
| JP | 2003-139745 | A | 5/2003 | |
| JP | 2004-279055 | A | 10/2004 | |
| JP | 2005-257701 | A | 9/2005 | |
| JP | 2007-187551 | A | 7/2007 | |
| JP | 2007-240256 | A | 9/2007 | |
| JP | 2008-185436 | A | 8/2008 | |
| JP | 2008-224494 | A | 9/2008 | |
| JP | 2009-74813 | A | 4/2009 | |
| JP | 2009-264992 | A | 11/2009 | |
| JP | 2011-252787 | A | 12/2011 | |
| JP | 2012-184931 | A | 9/2012 | |
| JP | 2013-160579 | A | 8/2013 | |
| JP | 2015-125115 | A | 7/2015 | |
| JP | 2016-035434 | A | 3/2016 | |
| JP | 2019-042807 | A | 3/2019 | |
| KR | 10-1998-0033843 | A | 8/1998 | |
| KR | 10-1115789 | B1 | 3/2012 | |
| KR | 10-2013-0110604 | A | 10/2013 | |
| RU | 2146817 | C1 | 3/2000 | |
| RU | 2231782 | C1 | 6/2004 | |
| WO | 2005/016566 | A1 | 2/2005 | |
| WO | 2018/010743 | A1 | 1/2018 | |

OTHER PUBLICATIONS

Young et al.; Translation of KR 19980033843 A; Aug. 5, 1998; Translated by Clairivate (Year: 1998).*
Hiroshi et al.; Translation of JPS61264251 A; Nov. 22, 1986; Translated by Clairivate (Year: 1986).*
Danielson; Translation of Danielson JPH1078336A; Mar. 24, 1998; Translated by EPO & Google (Year: 1998).*
Office Action issued Jul. 18, 2023 for counterpart Japanese Patent Application No. 2022-537888.
International Search Report dated Mar. 11, 2021 issued in International Patent Application No. PCT/KR2020/018538 (with English translation).
Russian Office Action dated Oct. 25, 2022 issued in Russian Patent Application No. 2022119645.
Extended European Search Report dated Nov. 28, 2022 issued in European Patent Application No. 20903840.5.
Gerald Schneibel et al., "Development of an Eddy Current based Inspection Technique for the Detection of Hard Spots on Heavy Plates," 19th World Conference on Non-Destructive Testing (WCNDT 2016), 2016, vol. 21 No.7, pp. 1-8.
Japanese Office Action dated Jan. 9, 2024 issued in Japanese Patent Application No. 2022-537888.
Chinese Office Action dated Feb. 13, 2025 issued in Chinese Patent Application No. 202080087845.2 (with English translation).

* cited by examiner

STEEL PLATE SURFACE MATERIAL PROPERTY TESTING DEVICE AND STEEL PLATE SURFACE MATERIAL PROPERTY TESTING METHOD

CROSS-REFERENCE OF RELATED APPLICATIONS

This application is the U.S. National Phase under 35 U.S.C. § 371 of International Patent Application No. PCT/KR2020/018538, filed on Dec. 17, 2020, which in turn claims the benefit of Korean Application No. 10-2019-0171461, filed on Dec. 20, 2019, the entire disclosures of which applications are incorporated by reference herein.

TECHNICAL FIELD

The present disclosure relates to a steel plate surface material property testing device and a steel plate surface material property testing method.

BACKGROUND ART

As a general hardness measurement method, a destructive method in which force with a specific load is applied to a surface of a measurement target object to measure hardness based on a shape after the application of the force has been widely used. Such a method is a method of calculating a hardness value by measuring a shape of a destroyed portion. However, a commonly used steel plate has a length of several meters to tens of meters and a width of about several meters, and it is practically impossible to measure a hardness of the entire steel plate by using an existing method.

As in Patent Document 1 or 2, a technology for measuring a characteristic of a steel plate by generating an eddy current through a coil to which alternating-current (AC) power is applied without contact has been developed, but accuracy is insufficient, and a plate-shaped material may not be rapidly and accurately measured, which is problematic.

CITATION LIST

Patent Document (Patent Document 1) JP 2000-227421 A
(Patent Document 2) WO 2018/010743 A1

DISCLOSURE

Technical Problem

An aspect of the present disclosure is to provide a steel plate surface material property testing device and a steel plate surface material property testing method capable of accurately and rapidly testing a material property of a steel plate by using an eddy current.

Technical Solution

The present disclosure provides a steel plate surface material property testing device and a steel plate surface material property testing method as follows in order to achieve the above-described purposes.

According to an aspect of the present disclosure, a steel plate material property testing device determining a material property of a surface of a steel plate by generating an eddy current in the steel plate includes: an eddy current tester disposed so as to face the steel plate; and a frame to which the eddy current tester is fixed, in which the eddy current tester includes: a coil disposed so as to form an alternating-current (AC) magnetic field in only one direction; an AC power supply unit connected to the coil; a sensor unit connected to the coil; and a material property determination unit connected to the sensor unit and determining the material property of the steel plate based on a measured signal obtained through the sensor unit.

The steel plate may be a rolled steel plate, and the one direction may be a rolling direction of the steel plate.

The AC power supply unit may supply a current of 0.5 kHz to 10 kHz to the coil, the eddy current tester may further include a yoke having both ends disposed so as to face a steel material, and having a "⊏"-shape, a "C"-shape, a "U"-shape, ora "V"-shape, and the coil may be wound around a central portion of the yoke.

The both ends of the yoke may be disposed so as to be perpendicular to the rolling direction of the steel plate.

The steel plate material property testing device may further include a demagnetization unit disposed on an upstream side of the eddy current tester and demagnetizing the steel plate moving to the eddy current tester.

The material property determination unit may determine the material property in consideration of a distance between the steel plate and the sensor unit, and the eddy current tester may further include a lift-off compensation unit connected to the coil, measuring a lift-off compensation value, and providing the lift-off compensation value to the material property determination unit.

The lift-off compensation unit may measure a Q factor when a resonant frequency of a current frequency provided by the AC power supply is provided, and provide the Q factor to the material property determination unit, and the material property determination unit may determine the material property based on a signal obtained by converting the measured signal of the sensor with the measured value of the lift-off compensation unit as a compensation coefficient.

The eddy current tester may further include a distance measurement instrument installed in the frame and configured to measure a distance, a value measured by the distance measurement instrument may be provided to the material property determination unit, and the material property determination unit may determine the material property of the steel plate in consideration of the measured distance value.

According to another aspect of the present disclosure, a steel plate surface material property determination method, in which a material property of a rolled steel plate is determined by generating an eddy current, includes: a magnetic field forming step of forming an AC magnetic field only in a rolling direction of the rolled steel plate by using a coil; a signal measuring step of measuring a signal through a sensor connected to the coil; and a material property determination step of determining a material property of the steel plate at a measurement portion based on the signal obtained in the signal measuring step.

The AC magnetic field may be formed by a current having a frequency of 0.5 to 10 kHz.

The sensor may measure an impedance signal of the coil, and in the material property determination step, the material property may be determined in consideration of a distance between the steel plate and the sensor.

The steel plate surface material property testing method may further include: a lift-off compensation value measuring step of measuring a lift-off compensation value through a lift-off compensation unit connected to the coil, in which in the material property determination step, the material property of the steel plate may be determined based on a signal obtained by converting the signal measured by the sensor with the compensation value of the lift-off compensation unit as a compensation coefficient.

In the lift-off compensation value measuring step, the lift-off compensation unit may measure a Q factor when a resonant frequency of a current frequency provided by the AC power supply is provided.

Advantageous Effects

As set forth above, according to an exemplary embodiment in the present disclosure, with the above-described configuration, the present disclosure may provide the steel plate surface material property testing device and the steel plate surface material property testing method capable of accurately and rapidly testing a material property of a steel plate by using an eddy current.

DESCRIPTION OF DRAWINGS

FIG. 6 is a schematic plan view, and FIG. 7 is a schematic side view.

Figure 1:
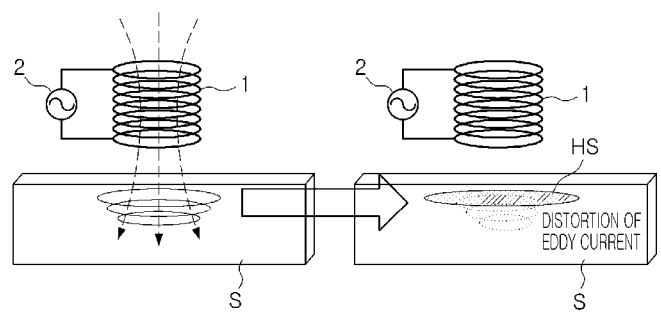
FIG. 1 is a conceptual diagram of a steel plate material property test using an eddy current.

| *DESCRIPTION OF REFERENCE NUMERALS* | |
|---|---|
| S: STEEL PLATE | F: FRAME |
| 100: EDDY CURRENT TESTER | 101: COIL |
| 102: AC POWER SUPPLY UNIT | 103: YOKE |
| 110: SENSOR UNIT | 120: MATERIAL PROPERTY DETERMINATION UNIT |
| 130: DISPLAY UNIT | 140: LIFT-OFF COMPENSATION UNIT |

BEST MODE FOR INVENTION

Hereinafter, exemplary embodiments in the present disclosure will be described in detail with reference to the accompanying drawings so that they may be easily practiced by those skilled in the art to which the present disclosure pertains.

A thick plate may be used for an oil pipeline or a gas pipe. In this case, a high rigidity and a high sour resistance are required to prevent a problem caused by a substance passing through the inside of the oil pipeline or the gas pipe. Usually, a thermo-mechanical control process (TMPC) steel is used as the thick plate with a high rigidity and a high sour resistance.

In a case where a hardness of such a thick plate is higher (250 Hv) than a standard hardness of 200 Hv, a portion having such a high hardness reacts with $H_2S$ under a high pressure condition to cause cracks, and as a result, hydrogen-induced cracking (HIC) in which the pipe is destroyed may occur. These contents are also disclosed in "DMV-OS-F101 (Submarine Pipeline System)" and "API 5L Specification for Line Pipe".

Therefore, it is necessary to prevent defects that may occur in the future by accurately determining a hardness of a subsurface portion of the thick plate. In particular, it is necessary to accurately measure a hardness of an entire region of a high-strength, high-corrosion-resistant thick plate because serious, complex problems such as environmental pollution as well as personnel and materiel loss occur in a case where an accident occurs in a raw material transportation pipe, and the present disclosure provides a method for accurately measuring the hardness of the high-strength, high-corrosion-resistant thick plates.

Hereinafter, a steel plate material property testing device capable of accurately measuring a hardness of a thick plate will be mainly described with an exemplary embodiment.

Figure 2:
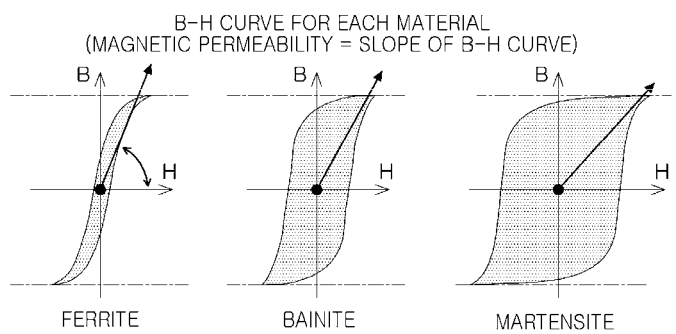
FIG. 2 is a B-H curve diagram for each material.

FIG. 1 is a conceptual diagram of a steel plate material property test using an eddy current. When an alternating-current (AC) magnetic field is applied to a steel plate S that is a target material in a state in which an AC power supply 2 is connected to a coil 1, an eddy current is generated in the steel plate S that is the target material, and the eddy current generated in the steel plate S is detected by using the coil 1. As shown in a B-H curve diagram for each material in FIG. 2, since a magnetic permeability is different for each material, the material of the steel plate may be confirmed through a detected signal.

Figure 3:
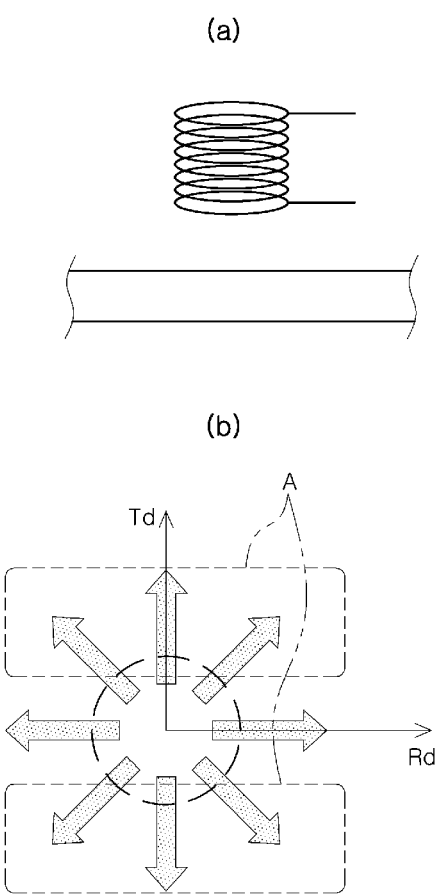
FIG. 3 is a schematic view of an eddy current tester illustrated in FIG. 1.
Figure 4:
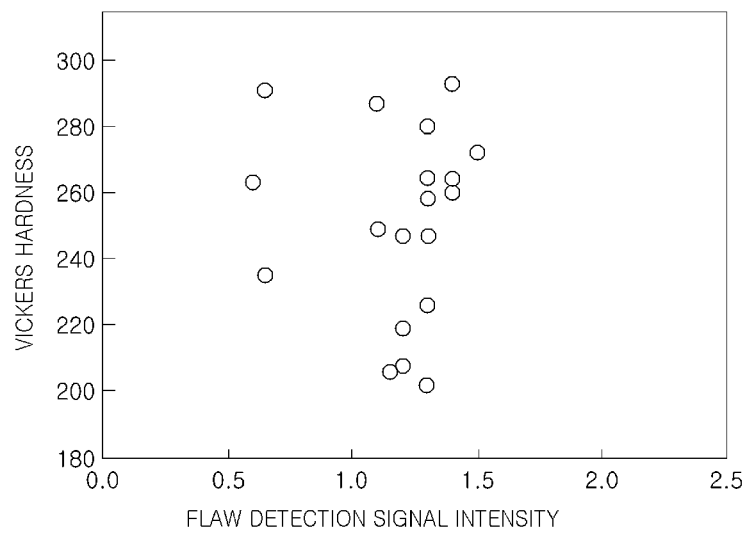
FIG. 4 is a graph of a measured signal obtained by the eddy current tester of FIG. 3 and hardness.

FIG. 3 is a schematic plan view of an eddy current tester illustrated in FIG. 1, and FIG. 4 is a graph of a measured signal obtained by the eddy current tester of FIG. 3 and a hardness.

As illustrated in FIG. 3, the coil 1 is wound in a vertical direction of the steel plate S, the AC magnetic field is formed around the coil 1 in a radial direction. As shown in the graph of FIG. 4 showing the signal measured from the coil 1 with respect to an actual hardness, a signal intensity is not related to the actual hardness, which means that accurate measurement may not be performed in actual measurement.

The present inventors have confirmed that most of the steel plates (particularly, the thick plate) are rolled materials, and the signal is affected by the rolled material becoming an anisotropic material in a rolling process. In particular, the present inventors have confirmed that the signal is distorted in a case where a rolling direction Rd and a magnetic field direction intersect each other as shown in a region indicated by a dotted line in FIG. 3. Accordingly, the present inventors have derived the steel plate material property testing device according to the present disclosure.

Figure 5:
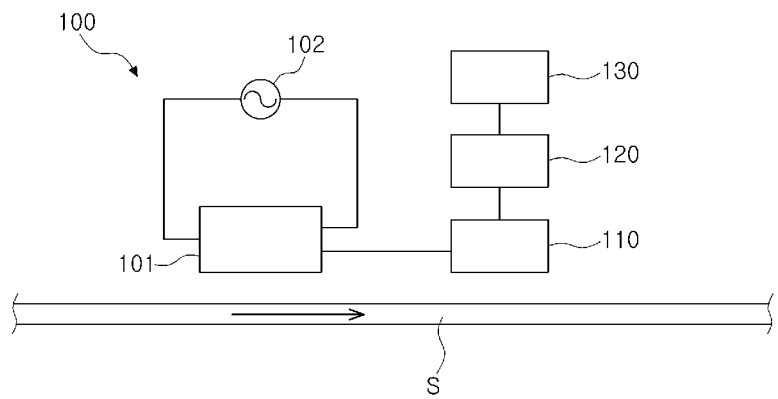
FIG. 5 is a schematic diagram of a testing device according to a first exemplary embodiment in the present disclosure.
Figure 6:
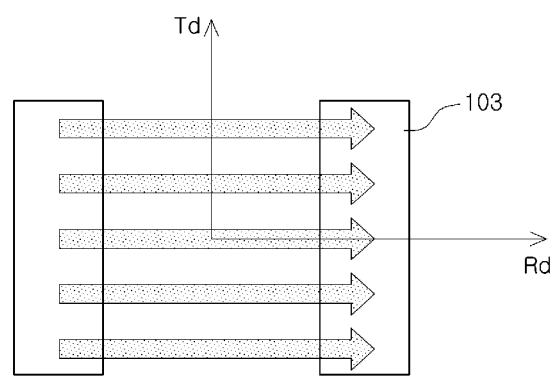
FIGS. 6 and 7 are schematic views of the eddy current tester illustrated in FIG. 1.
Figure 7:
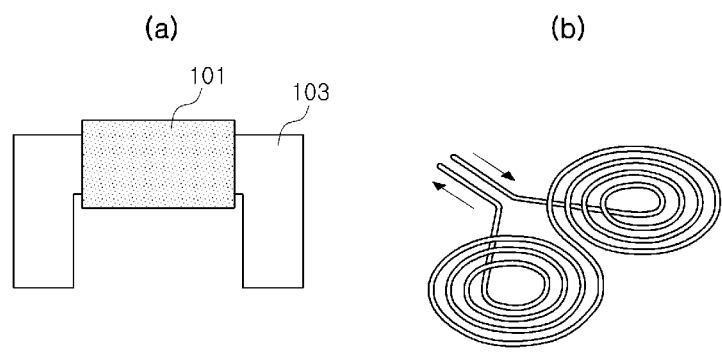

FIG. 5 is a schematic diagram of a testing device according to a first exemplary embodiment in the present disclosure, FIG. 6 is a schematic plan view of the eddy current tester illustrated in FIG. 1, and FIG. 7 is a schematic side view of the eddy current tester illustrated in FIG. 1.

As illustrated in FIG. 5, the testing device according to the present disclosure includes: an eddy current tester 100 disposed so as to face the steel plate S; and a frame to which the eddy current tester is fixed, in which the eddy current tester 100 includes: a coil 101 disposed so as to form an AC magnetic field in only one direction; an AC power supply unit 102 connected to the coil; a sensor unit 110 connected to the coil; and a material property determination unit 120 connected to the sensor unit 110 and determining the material property of the steel plate based on a measured signal obtained through the sensor unit 110. According to the present embodiment, a material property or a hardness of the entire region of the steel plate S is tested while moving the steel plate S in a state in which the eddy current tester 100 is fixed, but the manner in which the test is performed is not limited thereto. The steel plate S may be tested while moving the eddy current tester 100 in a state in which the steel plate S is fixed or while moving the eddy current tester 100 and the steel plate S together.

The eddy current tester 100 includes a yoke 103 around which the coil 101 is wound, and both ends of the yoke 103 are disposed so as to face the steel material. As illustrated in FIG. 6, both ends of the yoke 103 are disposed so as to be perpendicular to the rolling direction Rd of the steel plate S, and the coil 101 is wound around a central portion of the yoke 103 and forms a magnetic field in the rolling direction Rd.

In a case of performing rolling, a structure of the steel plate lengthens in the rolling direction, anisotropy increases, and in a case where a magnetic field is applied in the rolling direction, that is, in a direction in which the structure lengthens, a signal change due to the eddy current increases, such that accurate material property determination is possible.

At this time, when viewed from the side, the yoke 103 may have a "C"-shape or "U"-shape as illustrated in FIG. 7 (*a*), or may have a "⊏"-shape or a "V"-shape as illustrated in FIG. 7 (*b*). In other words, it is a matter of course that the coil 101 may have a different shape as long as the coil 101 may form a magnetic field in the rolling direction of the steel plate S.

The AC power supply unit 102 is connected to the coil 101, and provides AC power 102 having a predetermined frequency to the coil 101. The AC power supply unit 102 provides AC power in a range of 0.5 to 10 kHz, such that the material property of the surface of the steel plate S, for example, a hardness or a texture, may be understood.

The sensor unit 110 is connected to the coil 101 to measure a signal of the coil 101. The signal measured by the sensor unit 110 is provided to the material property determination unit 120 connected to the sensor unit 110. The sensor unit 110 may measure and provide an impedance signal of the coil 101.

The material property determination unit 120 determines the material property, for example, the hardness, based on a level of the signal measured by the sensor unit 110. Since the level of the signal measured by the sensor unit 110 has a correlation with the material property, the material property of the corresponding portion may be measured based on the level of the signal.

The material property determination unit 120 is connected to a display unit 130 to display a determination result of the material property determination unit 120, that is, a signal analysis result, to a user.

Figure 8:
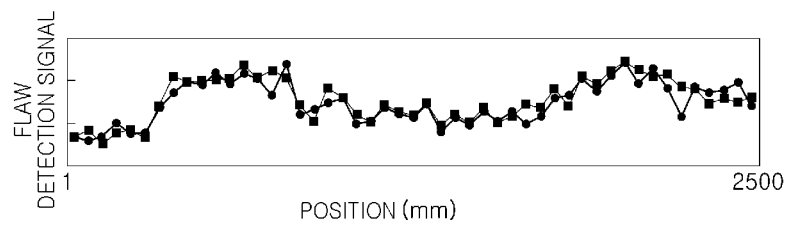
FIG. 8 is a graph of an actual hardness of a steel plate in a length direction.
Figure 9:
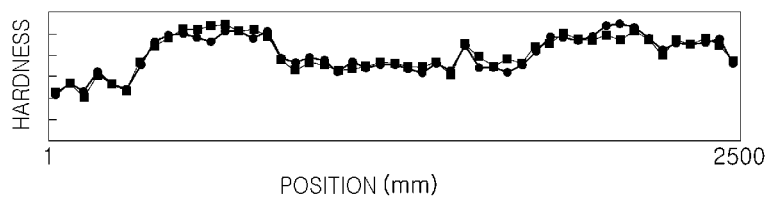
FIG. 9 is a graph of a measured signal obtained by the eddy current tester of FIG. 5.
Figure 10:
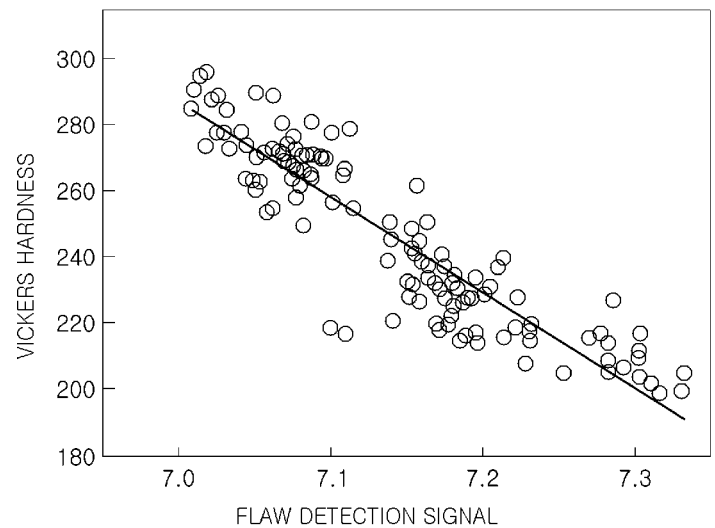
FIG. 10 is a graph of a relationship between a measured signal obtained by the testing device of FIG. 5 and the hardness.

FIG. 8 is a graph of an actual hardness of the steel plate S in a length direction, FIG. 9 is a graph of the measured signal obtained by the testing device of FIG. 5, and FIG. 10 is a graph of a relationship between the measured signal obtained by the eddy current tester of FIG. 5 and the actual hardness.

FIG. 8 shows the hardness of the actual steel plate S used in an experiment, measured by a general hardness measurement method (for example, a force with a specific load is applied to a surface of a measurement target object to measure a hardness based on a shape after the application of the force as described in Background Art), that is, the actual hardness.

FIG. 9 is a graph of the measured signal obtained by the testing device of FIG. 5, and it may be appreciated that the graph of FIG. 9 shows similar behavior to the actual hardness graph of FIG. 8. This may also be confirmed from FIG. 10. The level of the signal of the sensor unit 110 measured according to the first exemplary embodiment has a correlation with the hardness. Therefore, when the material property determination unit 120 determines the hardness according to the level of the signal of the sensor unit 110, the hardness may be accurately determined.

Figure 11:
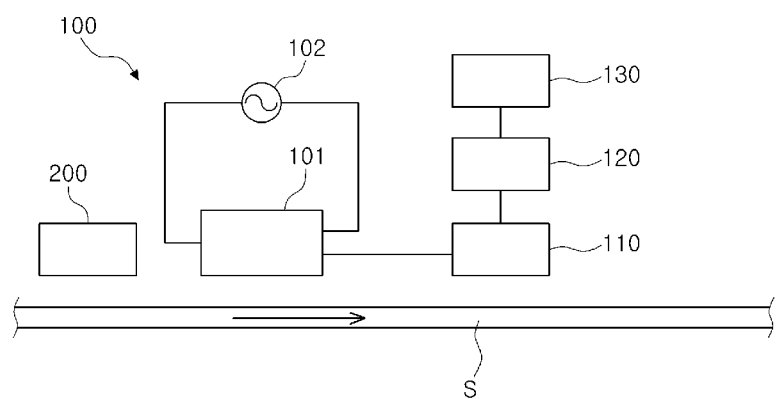
FIG. 11 is a schematic diagram of a testing device according to a second exemplary embodiment in the present disclosure.
Figure 12:
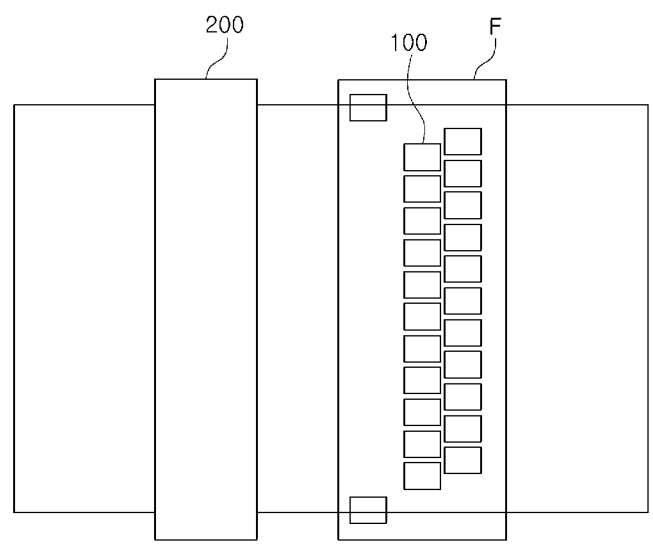
FIG. 12 is a schematic plan view of the testing device of FIG. 11.

FIGS. 11 and 12 illustrate a second exemplary embodiment in the present disclosure. A testing device according to the second exemplary embodiment includes an eddy current tester 100 and a demagnetization unit 200. Since the eddy current tester 100 is the same as the eddy current tester 100 of the first exemplary embodiment, a detailed description thereof will be omitted to avoid duplication.

In a case of a normal rolled material, the plate may be moved for rolling, and in this case, the plate is moved by an overhead crane including an electromagnet. In a case where the steel plate S is moved by the electromagnet, residual magnetization remains in the steel plate S, and this residual magnetization acts as a disturbance in signal measurement performed by the sensor unit 110.

According to the second exemplary embodiment, in order to remove such a disturbance factor, the demagnetization unit 200 is provided, and the demagnetization unit 200 is disposed on the upstream side of the eddy current tester 100. That is, the demagnetization unit 200 is disposed so that the steel plate S passes through the demagnetization unit 200 and then is tested by the eddy current tester 100.

Meanwhile, according to the second exemplary embodiment, the eddy current tester 100 is fixed to a frame F, and a plurality of eddy current testers 100 are arranged in two rows in a width direction of the steel plate S. In addition, the eddy current testers 100 in the first row and the eddy current testers 100 in the second row are alternately arranged in the width direction of the steel plate S, such that testing on the entire region of the steel plate S may be performed at once.

Figure 13:
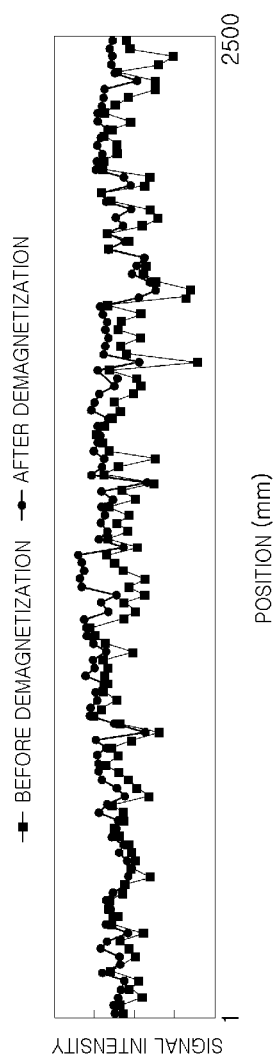
FIG. 13 is a graph of a measured signal in the length direction of the steel plate in the testing device of FIG. 11.

FIG. 13 is a graph of a measured signal in the length direction of the steel plate in the testing device of FIG. 11. As shown in the graph of a signal level according to the length when the demagnetization unit 200 is operated and a signal level according to the length when the demagnetization unit 200 is not operated for the same steel plate S, it may be appreciated that a drastic change in signal is reduced when the demagnetization unit 200 is operated, and thus accurate signal level measurement is possible.

Figure 14:
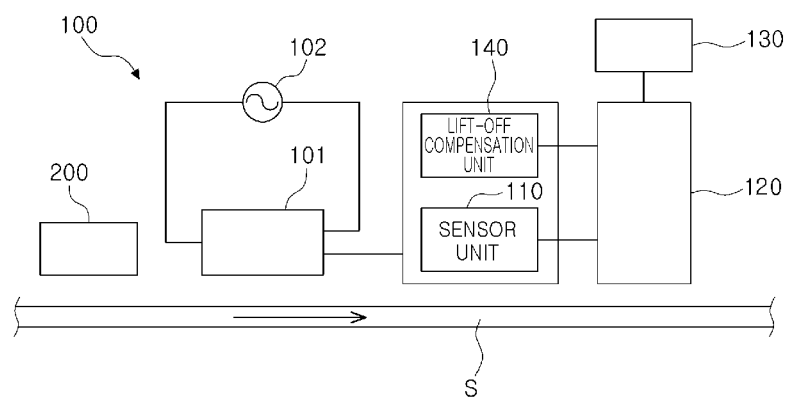
FIG. 14 is a schematic diagram of a testing device according to a third exemplary embodiment in the present disclosure.
Figure 15:
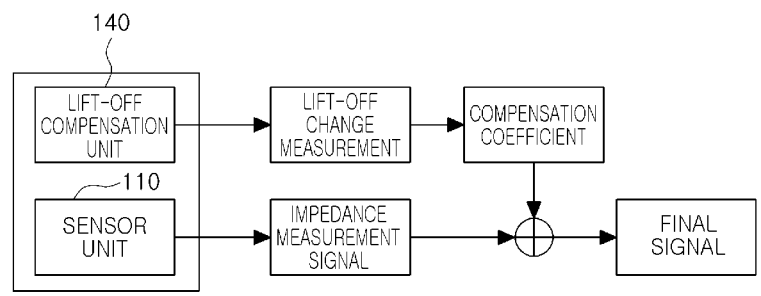
FIG. 15 is a schematic diagram illustrating a measurement method of an eddy current tester of FIG. 14.

FIG. 14 is a schematic diagram of a third exemplary embodiment in the present disclosure. A testing device according to the third exemplary embodiment includes a demagnetization unit 200 and an eddy current tester 100 similarly to the second exemplary embodiment. The eddy current tester 100 includes a coil 101 disposed so as to form an AC magnetic field in only one direction; an AC power supply unit 102 connected to the coil; a sensor unit 110 connected to the coil; a lift-off compensation unit 140 connected to the coil; a material property determination unit 120 connected to the sensor unit 110 and the lift-off compensation unit 140 and determining a material property of a steel plate based on measured signals obtained through the sensor unit 110 and the lift-off compensation unit 140; and a display unit 130 displaying an analysis result of the material property determination unit 120.

According to the present embodiment, the eddy current tester 100 may further include a yoke around which the coil 101 is wound, and the yoke may be the same as the yoke of the first exemplary embodiment. Also in the third exemplary embodiment, the coil 101 forms the magnetic field in the rolling direction Rd.

The AC power supply unit 102 is connected to the coil 101, and provides AC power 102 having a predetermined frequency to the coil 101. The AC power supply unit 102 provides AC power in a range of 0.5 to 10 kHz, such that the material property of the surface of the steel plate S, for example, a hardness or a texture, may be grasped.

In a case of the TMPC steel, accelerated cooling is performed. In a case where the amount of cooling water is uneven and is concentrated in a specific portion during the accelerated cooling, there is a possibility that a surface layer of the corresponding portion has a high hardness. As described above, such a high-hardness surface layer may cause hydrogen-induced cracking, and high-hardness portions generated for various reasons can also be detected in the range of 0.5 to 10 kHz, which enables detection of high-hardness defects caused by the accelerated cooling.

In addition, according to the present disclosure, the magnetic field is formed in one direction and then detection is performed in a lower frequency range as compared with the related art. As a result, a detection depth is also increased, which enables detection of high-hardness portions generated in the surface layer for various reasons.

The sensor 110 is connected to the coil 101 to measure a signal of the coil 101. The signal measured by the sensor unit 110 is provided to the material property determination unit 120 connected to the sensor unit 110. The sensor unit 110 may measure and provide an impedance signal of the coil 101.

The lift-off compensation unit 140 is connected to the coil 101 and measures a compensation coefficient changed by lift-off. For example, the lift-off compensation unit 140 measures a Q factor when a resonant frequency of a current frequency provided by the AC power supply unit 102 is provided to the coil 101. Since the Q factor varies according to lift-off a compensation coefficient capable of compensating for the lift-off is provided by measuring the Q factor.

The material property determination unit 120 combines the level of the signal measured by the sensor unit 110 with the compensation coefficient provided by the lift-off compensation unit 140 to obtain a final signal, and determines the material property, for example, the hardness, based on the final signal. The level of the signal measured by the sensor unit 110 has a correlation with the material property, and the compensation coefficient is related to the lift-off. Therefore, the final signal obtained by combining the level of the signal measured by the sensor unit 110 and the compensation coefficient is a signal obtained in consideration of a distance between the eddy current tester 100 and the steel plate S. As a result, the material property may be accurately determined.

The material property determination unit 120 is connected to a display unit 130 to display a determination result of the material property determination unit 120, that is, a signal analysis result, to a user.

Figure 16:
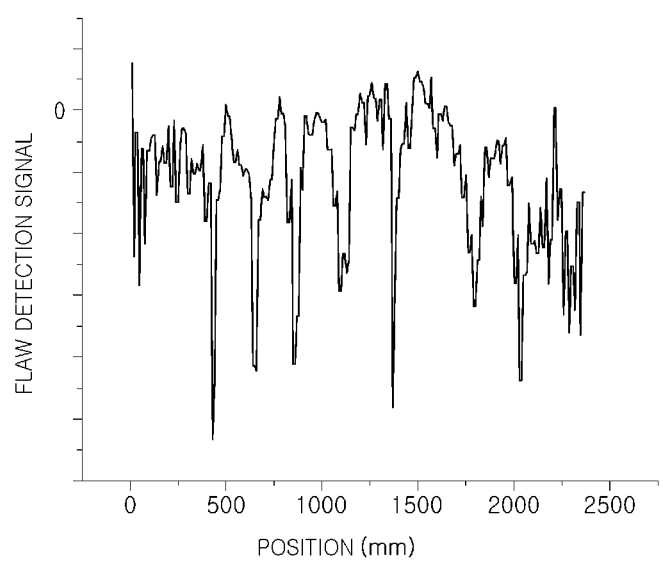
FIG. 16 is a graph of a signal measured by a sensor unit of FIG. 14.
Figure 17:
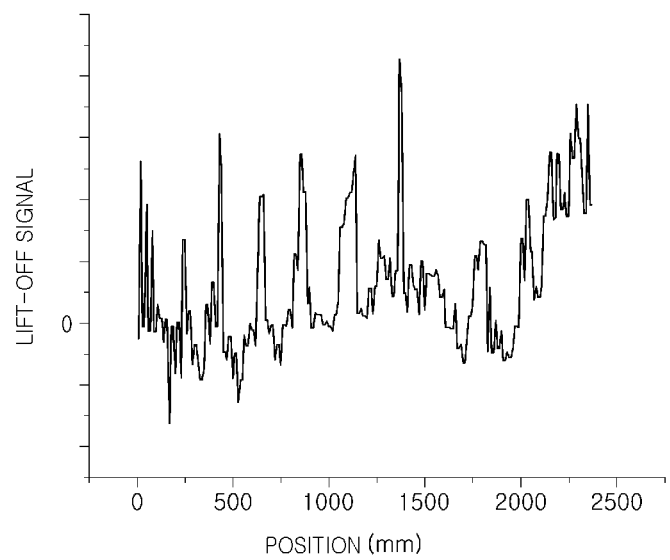
FIG. 17 is a graph of a signal measured by a lift-off compensation unit of FIG. 14.
Figure 18:
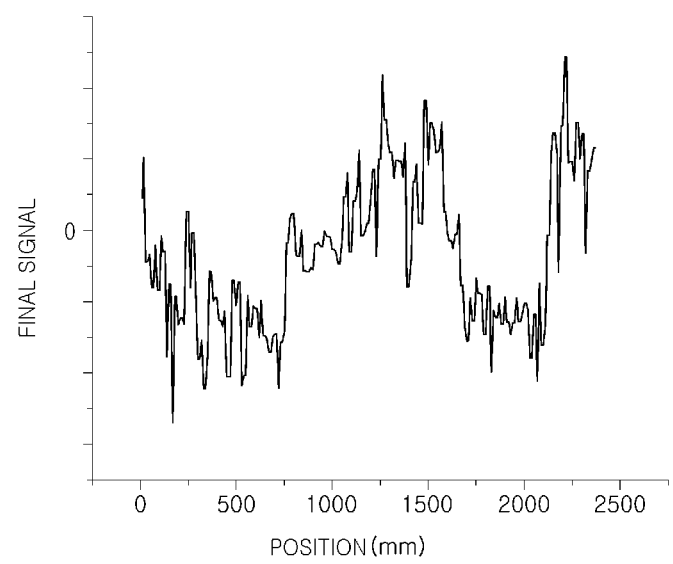
FIG. 18 is a graph of a final signal obtained by compensating the measured signal of FIG. 16 with a lift-off compensation signal of FIG. 17.
Figure 19:
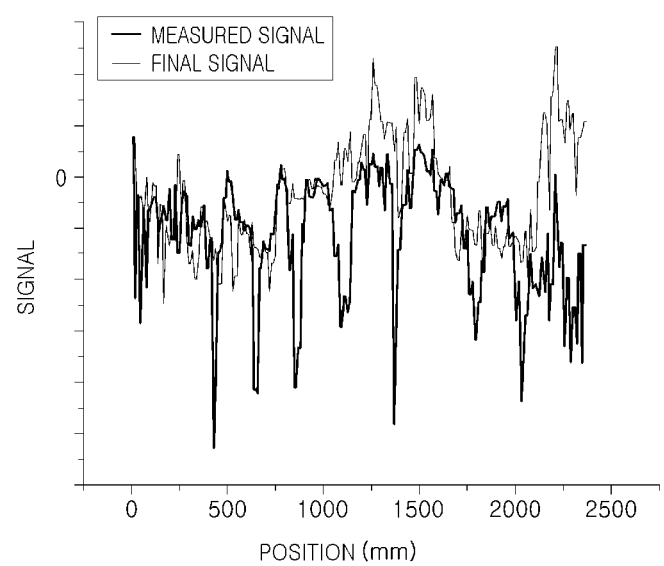
FIG. 19 is a graph showing the measured signal of FIG. 16 and the final signal graph of FIG. 18 together.

FIGS. 16 to 19 illustrate graphs of signals obtained by the third exemplary embodiment. FIG. 16 is a graph of the signal measured by the sensor unit 110 of the third exemplary embodiment, FIG. 17 is a graph of the lift-off compensation coefficient measured by the lift-off compensation unit 140 of the third exemplary embodiment, and FIG. 18 is a graph of the final signal obtained by combining the measured signal of FIG. 16 with the measured signal of FIG. 17. FIG. 19 is a graph showing the final signal (FIG. 18) and the measured signal (FIG. 16) of the sensor unit 110 together.

FIG. 19 shows comparison between the final signal obtained by combining the lift-off compensation coefficient of the lift-off compensation unit 140 with the measured signal of the sensor unit 110*m* and the measured signal obtained by the sensor unit 110.

Figure 20:
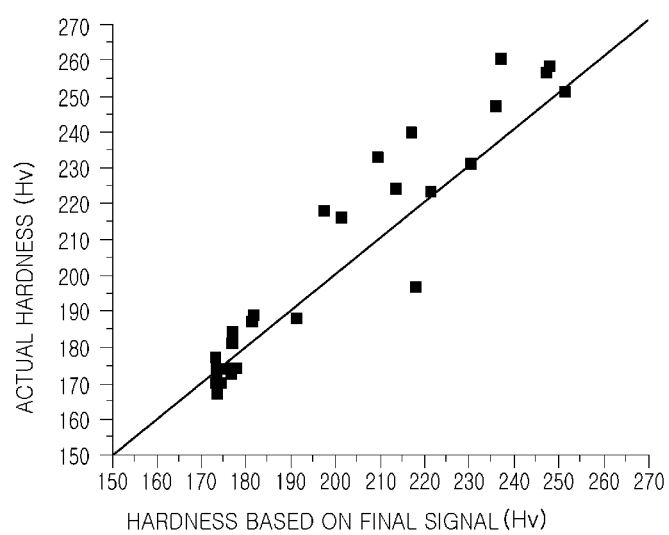
FIG. 20 is a graph showing a relationship between the final signal of FIG. 18 and the hardness.

As illustrated in FIG. 20, it may be confirmed that a correlation between the actual hardness and the final signal is improved by receiving a compensation signal from the lift-off compensation unit 140 and combining the compensation signal with the signal of the sensor unit 110, which indicates that the lift-off compensation unit 140 improves the accuracy in material property determination. On the other hand, referring to FIG. 19, it may be appreciated that the measured signal before compensation has a pattern different from that of the final signal, which indicates that the accuracy in material property determination deteriorates.

Figure 21:
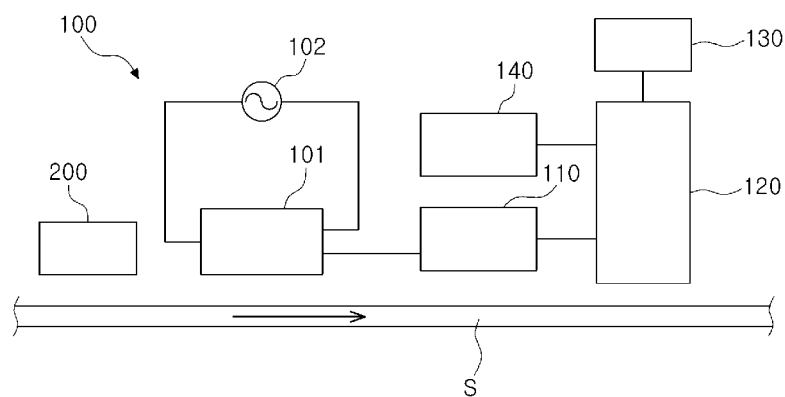
FIG. 21 is a schematic diagram of a testing device according to a fourth exemplary embodiment.

FIG. 21 illustrates a fourth exemplary embodiment in the present disclosure. A testing device according to the fourth exemplary embodiment includes a demagnetization unit 200 and an eddy current tester 100 similarly to the third exemplary embodiment. The eddy current tester 100 is fixed to a frame, and includes: a coil 101 disposed so as to form an AC magnetic field in only one direction; an AC power supply unit 102 connected to the coil; a sensor unit 110 connected to the coil; a lift-off compensation unit 140 provided in the frame; a material property determination unit 120 connected to the sensor unit 110 and the lift-off compensation unit 140 and determining a material property of a steel plate based on measured signals obtained through the sensor unit 110 and the lift-off compensation unit 140; and a display unit 130 displaying an analysis result of the material property determination unit 120.

Since the fourth exemplary embodiment is the same as the third exemplary embodiment except for the lift-off compensation unit 140, only the lift-off compensation unit 140 will be described, and a description of other parts will be omitted to avoid a description overlapping with the third exemplary embodiment.

According to the fourth exemplary embodiment, the lift-off compensation unit 140 is not connected to the coil 101, unlike the third exemplary embodiment, and is provided separately. That is, the lift-off compensation unit 140 is fixed/provided in the frame, measures a distance between the steel plate S and the eddy current tester 100, and provides the measured value to the material property determination unit 120. The lift-off compensation unit 140 may be implemented by various distance measuring means such as a laser range finder and a physical range finder. The distance obtained by the lift-off compensation unit 140 is provided as the compensation coefficient to the material property determination unit 120 to compensate for the measured signal obtained from the sensor unit 110. For example, in a case where the distance between the steel plate S and the eddy current tester 100 increases, the signal measured from the sensor unit 110 is amplified.

Figure 22:
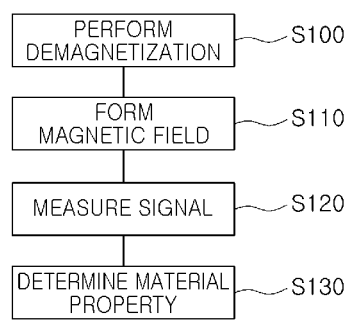
FIG. 22 is a flowchart of a testing method according to the present disclosure.

FIG. 22 is a flowchart of a testing method according to the present disclosure.

As illustrated in FIG. 22, the testing method according to the present disclosure includes: a demagnetization step of removing residual magnetization of a rolled material (S100); a magnetic field forming step of forming an AC magnetic field only in a rolling direction of the rolled steel plate by using a coil (S110); a signal measuring step of measuring a signal through a sensor connected to the coil (S120); and a material property determination step (S130) of determining a material property of the steel plate at a measurement portion based on the signal obtained in the signal measuring step.

In the demagnetization step (S100), the residual magnetization is removed by the demagnetization unit, and the steel plate S is returned to the origin of the B-H curve.

In the magnetic field forming step (S110), the magnetic field is formed by supplying a current having a frequency of 0.5 to 10 kHz to the coil through an AC power supply. The coil is preferably wound in the rolling direction so as to form the magnetic field only in the rolling direction of the steel plate.

In the signal measuring step (S120), an impedance signal changed by an eddy current is measured through the sensor connected to the coil.

In the material property determination step (S130), the material property of the measurement portion is determined based on a relationship between the measured signal obtained in the signal measuring step (S130) and the material property. In this case, the material property may be a texture of the surface of the steel plate, or hardness.

Meanwhile, in the testing method according to the present disclosure, the material property may also be determined in consideration of a distance between the steel plate and the sensor. According to an exemplary embodiment, the steel plate surface material property testing method further includes a lift-off compensation value measuring step of measuring a lift-off compensation value through a lift-off compensation unit connected to the coil, and in the material property determination step, the material property of the steel plate may be determined based on a signal obtained by converting the measured signal of the sensor with the compensation value of the lift-off compensation unit as a compensation coefficient.

Here, in the lift-off compensation value measuring step, the lift-off compensation unit may also measure, as the compensation value, a Q factor when a resonant frequency of a current frequency provided by the AC power supply is provided.

Although the present disclosure has been described above focusing on the exemplary embodiments in the present disclosure, the present disclosure is not limited to the exemplary embodiments, and it is a matter of course that the present disclosure may be implemented with various modifications.

The invention claimed is:

1. A steel plate high-hardness defects detecting device detecting high-hardness defects of a surface of a steel plate caused by accelerated cooling by generating an eddy current in the steel plate, the device comprising:
   an eddy current tester disposed so as to face the steel plate; and
   a frame to which the eddy current tester is fixed,
   wherein the eddy current tester includes:
   a yoke unit having both ends disposed so as to face a steel material, and having a "⊏"-shape, a "C"-shape, a "U"-shape, or a "V"-shape;
   a coil unit comprising a coil wound around a central portion of the yoke unit and disposed so as to form an alternating-current (AC) magnetic field in only one direction at the both ends of the yoke unit through the coil and the yoke unit;
   an AC power supply unit connected to the coil;
   a sensor unit connected to the coil;
   a material property determination unit connected to the sensor unit and determining the material property of the steel plate based on a measured signal obtained through the sensor unit and
   a lift-off compensation unit connected to the coil, measuring a lift-off compensation value, and providing the lift-off compensation value to the material property determination unit,
   wherein the both ends of the yoke unit are parallel,
   the AC power supply unit supplies a current of 0.5 kHz to 10 kHz to the coil unit,
   the material property determination unit determines the material property in consideration of a distance between the steel plate and the sensor unit, and
   the lift-off compensation unit measures a Q factor when a resonant frequency of a current frequency provided by the AC power supply unit is provided, and provides the Q factor to the material property determination unit.

2. The steel plate high-hardness defects detecting device of claim 1, wherein the steel plate is a rolled steel plate, and the one direction is a rolling direction of the steel plate.

3. The steel plate high-hardness defects detecting device of claim 2, wherein the steel plate is a thick plate.

4. The steel plate high-hardness defects detecting device of claim 2, wherein the both ends of the yoke unit are disposed so as to be perpendicular to the rolling direction of the steel plate.

5. The steel plate high-hardness defects detecting device of claim 1, further comprising a demagnetization unit disposed on an upstream side of the eddy current tester and demagnetizing the steel plate moving to the eddy current tester.

6. The steel plate high-hardness defects detecting device of claim 1, wherein a plurality of coils are arranged in rows in a width direction of the steel plate to continuously test the surface of the steel plate.

7. The steel plate high-hardness defects detecting device of claim 1, wherein the lift-off compensation value is the Q factor.

8. A steel plate high-hardness defects detecting method in which high-hardness defects of a surface of a steel plate caused by accelerated cooling are detected by generating an eddy current, the steel plate high-hardness defects detecting method comprising:
- a magnetic field forming step of forming an AC magnetic field in only one direction by using a coil;
- a signal measuring step of measuring a signal through a sensor connected to the coil;
- a material property determination step of determining the material property of the steel plate at a measurement portion based on the signal obtained in the signal measuring step; and
- a lift-off compensation value measuring step of measuring a lift-off compensation value through a lift-off compensation unit connected to the coil,
- wherein the coil is wound around a yoke unit having both ends disposed so as to face a steel material, and having a "⊏"-shape, a "C"-shape, a "U"-shape, or a "V"-shape,
- the magnetic field forming step form the AC magnetic field in only one direction at the both ends of the yoke unit through the coil and the yoke unit,
- wherein in the material property determination step, the material property of the steel plate is determined in consideration of a distance between the steel plate and the sensor and based on a signal obtained by converting the signal measured by the sensor with the compensation value of the lift-off compensation unit as a compensation coefficient,
- wherein the AC magnetic field is formed by a current having a frequency of 0.5 to 10 kHz, and
- wherein in the lift-off compensation value measuring step, the lift-off compensation unit measures a Q factor in response to a resonant frequency of a current frequency provided by an AC power supply being provided.

9. The steel plate high-hardness defects detecting method of claim 8, wherein the one direction is a rolling direction of the rolled steel plate.

10. The steel plate surface material property testing method of claim 9, wherein the AC magnetic field is formed by a current having a frequency of 0.5 to 10 kHz.

11. The steel plate surface material property testing method of claim 8, wherein the sensor measures an impedance signal of the coil.

* * * * *